June 10, 1952 A. A. BRANT 2,599,688
RESISTIVITY METHOD FOR DETERMINING ORE CONTINUITY
Filed Jan. 17, 1951 3 Sheets-Sheet 1

ARTHUR A. BRANT
INVENTOR.

BY
ATTORNEYS

| CASE NO. | CONDITION | VOLTS AT $P_1$ PER AMPERE OF CURRENT AT $C_1$ |
|---|---|---|
| 1 | NO ORE PRESENT | 1.66 (NORMAL OR REFERENCE POTENTIAL) |
| 2 | BODY $B_1$ OR $B_1'$ ALONE | 1.59 |
| 3 | BODY $B_2$ OR $B_2'$ ALONE | 1.73 |
| 4 | BODY $B_3$ OR $B_3'$ ALONE | 1.66 |
| 5 | BODIES $B_1$ AND $B_1'$ PRESENT | 1.52 |
| 6 | BODIES $B_1$ AND $B_2'$ OR $B_2$ AND $B_1'$ PRESENT | 1.66 |
| 7 | BODIES $B_3$ AND $B_3'$ PRESENT | 1.66 |
| 8 | BODIES $B_2$ AND $B_2'$ PRESENT | 1.80 |
| 9 | BODY $B_4$ PRESENT | 3.25 |

ARTHUR A. BRANT
INVENTOR.

BY
ATTORNEYS

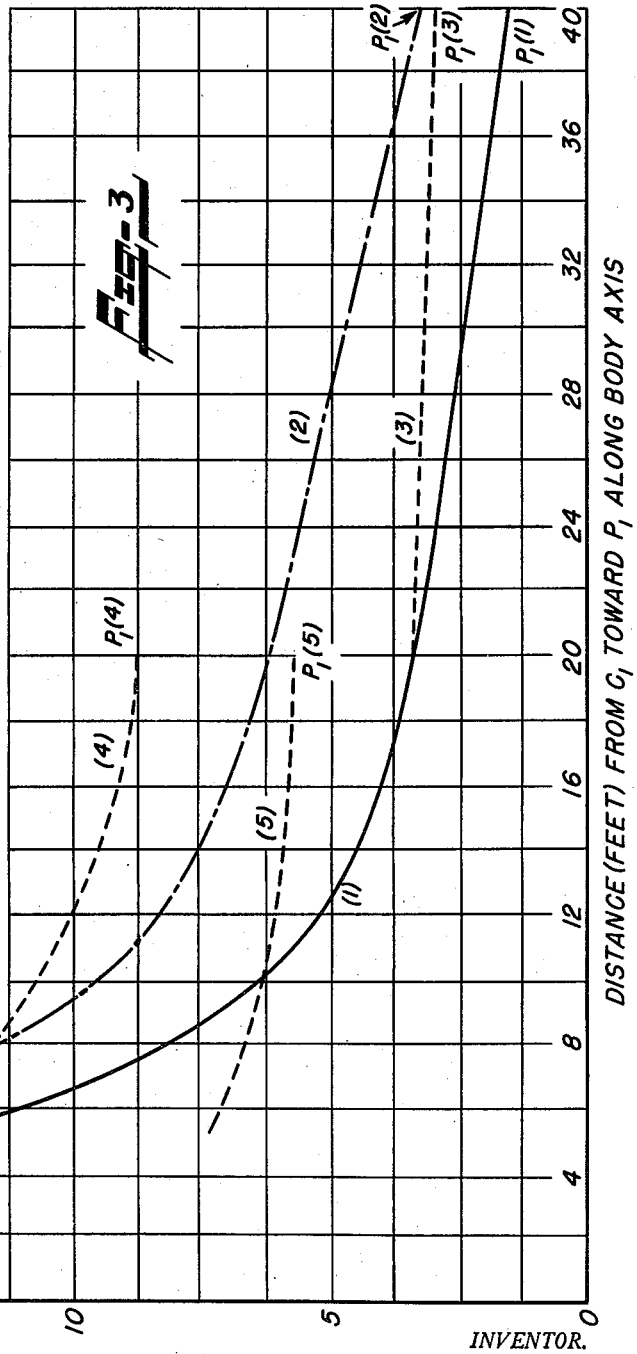

Patented June 10, 1952

2,599,688

UNITED STATES PATENT OFFICE 2,599,688

RESISTIVITY METHOD FOR DETERMINING ORE CONTINUITY

Arthur A. Brant, Clarkdale, Ariz., assignor to Newmont Mining Corporation, New York, N. Y., a corporation of Delaware Application January 17, 1951, Serial No. 206,497

3 Claims. (Cl. 175—182)

This invention relates to geophysical exploration and more particularly to a novel method for determining whether or not two spaced points of ore occurrence are actually interconnected by ore-bearing material.

In mining development and exploration operations it is frequently of importance to know the extent of an ore-bearing body and the broad object of this invention is the provision of a simple method and procedure for determining whether the space between separated points on the ground surface, or in underground workings, or in a drill hole, includes an interconnected zone or body of ore-bearing material.

A more specific object of the invention is the provision of a method for determining ore continuity by passing a current into the ground at one point of ore occurrence, determining the potential per unit of current flow at a spaced point of ore occurrence and comparing such potential with that obtained for barren rock across a comparable distance.

These objects and advantages will become apparent from the following description when taken with the accompanying drawings wherein:

Figure 3 is a series of curves illustrating the potentials obtained at the ends of various shaped, continuous ore bodies and at points remote from that of current entry.

It is known that, in general, an ore-bearing zone is of contrasting physical property relative to that of barren ground and has a finite cross-section such as pod-like similar to a sphere, pencil-like comparable to a prolate spheroid, or cylinder or pencil-like comparable to an oblate spheroid. These rough, approximate geometrical forms of ore-bearing zones are considered in my novel method for determining whether or not such zones are discontinuous or interconnected.

Figure 1:
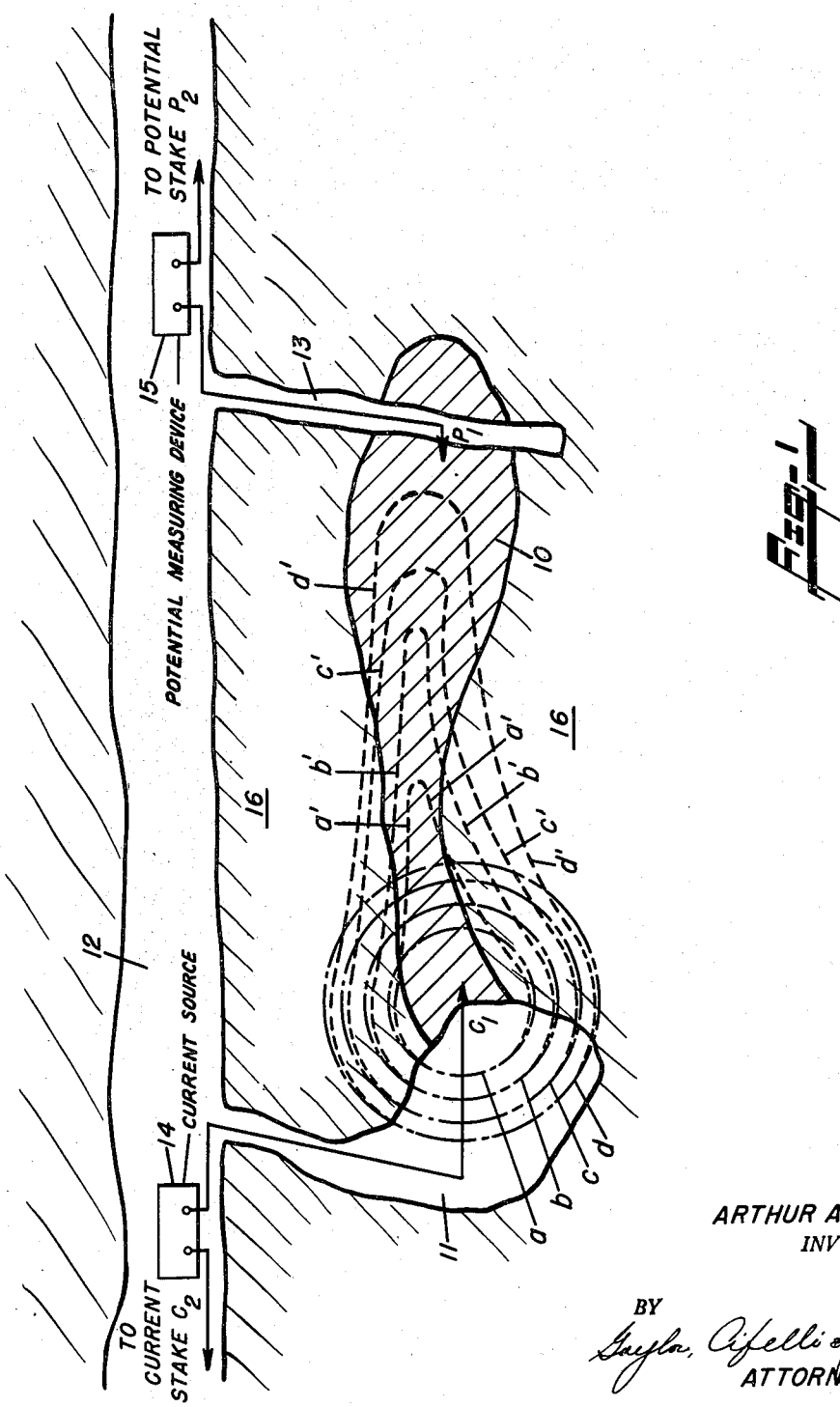
Figure 1 illustrates the practice of the invention where ore occurrences are known at two, separate underground locations and it is necessary to determine whether or not such ore occurrences are inter-connected by ore material.

Reference is made to Figure 1, wherein there is shown a subterranean ore body 10. Contact with one end of the ore body is made within the stope 11 extending down from a conventional drift 12. A drill hole 13 is made at some remote point. If such drill hole does not intersect an ore bearing zone at a reasonable depth from the drift it is abandoned and another one is drilled at another point. When the drill hole does pass through an ore zone such particular drill hole is used in connection with the practice of this invention. However, it is pointed out that at the time the drill hole is made it is not known whether the intersected ore zone is a continuation of the ore bearing material evident within the stope 11, or is a separate mass of ore-bearing material disconnected from that appearing in the stope. For purposes of this invention it is necessary that physical contact be made simultaneously with both ore bearing zones, that is, at a point within the stope and at a point within the drill hole. The necessary electrical contacts are established with the exposed surfaces of the ore zones.

A current stake $C_1$ is driven into the surface of the ore body exposed within the stope 11, such stake being placed at the approximate center of the exposed surface area of the ore body. A second current stake $C_2$ is driven into the ground, anywhere, at a distance relatively far removed from the stake $C_1$, as, for example, remotely along the drift 12. These current stakes are connected to a current generator 14 capable of providing either a continuous D.-C. current, a periodically reversed D.-C. current, a commutated D.-C. current, or an alternating current, as desired. A potential stake $P_1$ is placed into contact with the exposed surface of the separated, other ore occurrence intersected by the drill hole, such stake being placed at the approximate center of the exposed surface area of such ore zone. A second potential stake $P_2$ is placed into contact with the ground at any point within the drift 12, but at a point relatively far removed from the potential stake $P_1$ and the current stakes $C_1$, $C_2$. These potential stakes are connected to a suitable voltage-measuring device 15 which may be either a potentiometer, vacuum tube voltmeter, oscilloscope or a flux meter, from which the potential difference appearing across the potential stakes $P_1$, $P_2$ can be measured or derived. The ore body 10 is of good electrical conductivity relative to its surrounding ground 16, although at this time it is not known that the ore body 10 inter-connects the exposures in the stope 11 and the drill hole 13.

If the current stake $C_1$ is in an extensive, approximate homogeneous medium, a flow of current between the stakes $C_1$ and $C_2$ results in equipotential surfaces that are approximately spherical relative to the center at the stake $C_1$. Such approximately circular equi-potential surfaces, in the plane of Figure 1, are identified by the letters $a$, $b$, $c$, $d$. However, any lateral extension of the homogeneous ore zone, in the direction of the drill hole 13, extenuates the potential surfaces in the direction of extent of the ore body. Under this condition the potential lines are distorted from the circular form to that shown by the dotted lines $a'$, $b'$, $c'$, $d'$. It should be noted that, laterally from the ore body, that is, in the direction of the body's narrowest dimension perpendicular to its extension, the potential surfaces actually lie within the undisturbed or normal potential surfaces $a$, $b$, $c$, $d$. The greatest displacement of the equi-potential surfaces occur within the ore body in the direction of its extension.

Thus, if the potential electrode $P_1$ is placed in what is thought to be the extension of the ore body its recorded potential due to current flow into the ore body and surroundings from $C_1$, will be greater, relative to a far distant potential point $P_2$, than is the case when the ore body is entirely absent, when it is merely a local occurrence around $C_1$, or when unconnected local occurrences are present at both $C_1$ and $P_1$.

This is readily apparent since the absence of good conducting ore material at any point or locality between $C_1$ and $P_1$ will serve to compress, toward $C_1$ the otherwise extended potential surfaces $a'$, $b'$, $c'$ and $d'$, thus reducing the potential at $P_1$ relative to $P_2$.

In practice, the reference potential electrode $P_2$ is placed sufficiently far away from the two current electrodes so that the potential at $P_2$ due to them can be considered approximately zero. Also the return current electrode $C_2$ is maintained sufficiently far from $P_1$ and $P_2$ so that its resulting potential on either is negligible.

In an extensive, homogeneous medium of resistivity $\rho_2$, ohms per cm. cube, the recorded voltage difference between two arbitrarily located potential electrodes $P_1$ and $P_2$ due to two randomly located current electrodes $C_1$ and $C_2$ is:

$$V_{P_1P_2} = \frac{\rho_2 I}{4\pi}\left[\frac{1}{C_1P_1} - \frac{1}{C_1P_2} - \frac{1}{C_2P_1} + \frac{1}{C_2P_2}\right]$$

where I is the current flowing into the medium at $C_1$ in amperes and $C_1P_1$, for example, is the distance from $C_1$ to $P_1$ in cms.

For the above mentioned case it would be experimentally arranged to have the distances $C_1P_2$, $C_2P_1$, $C_2P_2$ all very large compared to $C_1P_1$. Then $V_{P_1P_2}$ becomes $$\frac{\rho_2 I}{4\pi} \times \frac{1}{C_1P_1}$$

which can can be called the potential at $P_1$ and designated by $V_{P_1}$.

Thus, in carrying out the method, $C_1$ is placed in one ore exposure and $P_1$ in the other, as in Figure 1. $C_2$ and $P_2$ are removed far enough to make $$\frac{1}{C_1P_1}, \frac{1}{C_2P_1}, \frac{1}{C_2P_2}$$

negligible.

The resistivity of the ore, $\rho_1$, ohms per cms. cube, can be derived well within the ore exposure as far away from its margins as possible. For this latter, the current, electrode, $C_1$, is placed centrally in an ore exposure and potential pick-ups $P_1$ and $P_2$ are now located well within the ore and but a short distance from $C_1$. Thus $C_1P_1$ may be one or two feet, and $C_1P_2$ two or three feet. Then, $$V_{P_1P_2} = \frac{\rho_1 I}{4\pi}\left[\frac{1}{C_1P_1} - \frac{1}{C_1P_2}\right]$$

giving $\rho_1$ for the ore in ohms per cm. cube. If the ore exposure is in a stope or opening the above relation involving $\rho_1$ must be multiplied by a corrective factor to take into consideration the effect of the opening. Thus, if the exposed surface of the ore, where $C_1$, $P_1$, and $P_2$ are placed, is large in dimension compared to $C_1P_2$ say, then $4\pi$ is replaced by $2\pi$ in the above equation, while if $C_1$, $P_1$, $P_2$ are contacting the intersection of ore in a drill hole generally of diameter less than 2 inches, the $4\pi$ is retained. Either of these two situations usually apply where the resistivity of the ore is being determined.

The resistivity of the surrounding medium, $\rho_2$ ohms per cm. cube, can be determined by conventional methods.

If no conductor, i. e., ore, is present, $$V_{P_1P_2} = \frac{\rho_2 I}{4\pi} \times \frac{1}{C_1P_1} = V_{P_1} = \text{Normal potential}$$

The potential at $P_1$ relative to $P_2$ will be highest if a good conductor, continuous between $C_1$ and $P_1$, is present.

Figure 2:
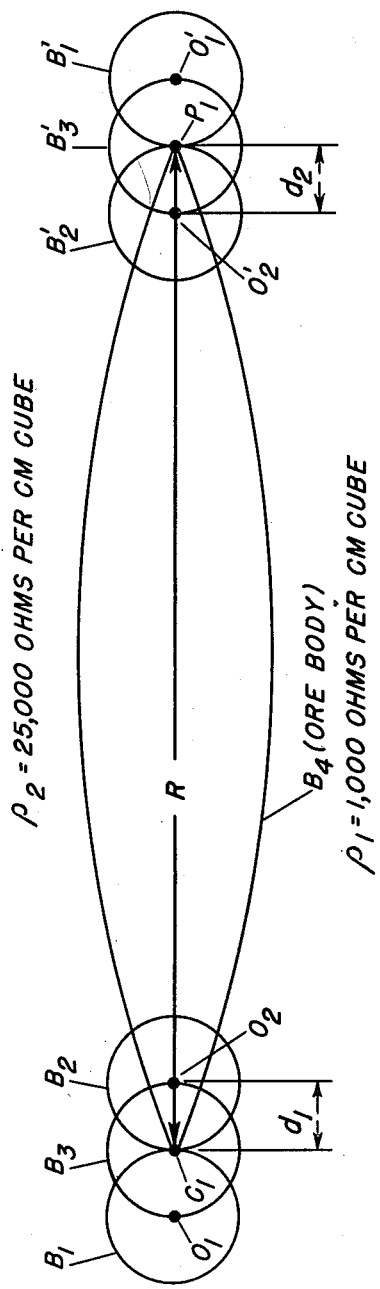
Figure 2 is a pictorial representation and tabulations to illustrate the mathematical validity of the method.

Reference is now made to Figure 2 to illustrate the following discussion of the effect of local ore occurrences (at $C_1$ and $P_1$) vs. continuity of ore (between $C_1$ and $P_1$). The reference letters $B_1$, $B_2$ and $B_3$ identify local ore bodies each having a radius of two (2) feet. $C_1$ is the current stake contacting the center of the local ore body $B_3$ or the edges of $B_1$ or $B_2$. Similar local ore bodies $B'_1$, $B'_2$ and $B'_3$ could be present at some distance from the first mentioned ore bodies and $P_1$ identifies the potential stake making contact with the center of the ore body $B'_3$, or the margins of $B'_1$ or $B'_2$. Such local ore bodies may be present in the regions of the current and potential electrodes $C_1$ and $P_1$, respectively, without ore continuity therebetween.

If, however, there exists ore continuity between the local groups of ore bodies, as illustrated in Figure 2 by $B_4$ (a prolate spheroid 40 feet long and 2 feet radius), the potential across the potential electrodes will be higher than the normal potential by reason of the extenuation of the equi-potential surfaces about the current electrode $C_1$ and toward the pick-up electrode $P_1$, as explained hereinabove. It can be shown that the presence of local ore occurrences at the points $C_1$ and $P_1$ will only give a higher potential than normal in certain cases, namely, when the local bodies have a greater portion of their volume lying between the current stake $C_1$ and the potential stake $P_1$, that is, as shown by the local ore bodies $B_2$ and $B'_2$ in Figure 2. This is the very case for which there is a tendency toward continuity.

The effect of the local ore body at either of the points $C_1$ and $P_1$ can be derived. Let $\sigma_2 = $ conductivity of the surrounding medium $=$ $$\frac{1}{\rho_2}$$

where $\sigma_2$ is in ohms per cm. cube;

$\sigma_1 = $ conductivity of the ore $=$ $$\frac{1}{\rho_1}$$

In the usual case $\sigma_1 \geq 10\sigma_2$

If we assume that the current electrode $C_1$ is in the ore, then the normal voltage across potential electrodes $P_1$, $P_2$ ($P_2$ being at a point relatively far removed from $P_1$) is:

$$V_{P_1P_2} = \frac{I}{4\pi} \times \frac{1}{R} \times \frac{1}{\sigma_2} + \frac{I}{4\pi R \sigma_2} \sum_{n=1}^{\alpha} \frac{d^n}{R^n} \times \frac{2n+1}{n\left(\frac{\sigma_1}{\sigma_2}+1\right)+1} \times P_n \cos\theta$$

where;

$d$ is the distance, in cm., between the actual point of contact of the current electrode $C_1$ and the center of the ore body $B$=distance $C_1O$ (depending on which of the bodies $B_1$, $B_2$, $B_3$ are taken at $C_1$); $-d$ may equal $C_1O_1$; $C_1O_2$; or $C_1O_3$ which is zero (0);

$R$ is the distance $OP_1$;

$\theta$ is the angle formed by the lines $C_1$, $O$, $P_1$;

$$\sum_{n=1}^{\alpha}$$

represents the sum of a series of terms for $n=1, 2, 3 \ldots \alpha$; and $P_n \cos\theta$ is the Legendre polynormal, first kind, order zero.

Assume that the situation is such that the angle $\theta$ is 0 degrees or 180 degrees for which cases the distance between $C_1$ and $P_1 = a$ is either $R-d$ (for body $B_1$) or $R+d$ (for body $B_2$). Then, $$\sum_{n=1}^{\alpha} \frac{d^n}{R^n} P_n \cos\theta, \text{ for } \theta \backsimeq 0°$$

becomes $$\frac{d}{R} + \frac{d^2}{R^2} + \ldots = \frac{d}{R} \times \frac{1}{1-\frac{d}{R}} = \frac{d}{a}$$

Likewise, $$\sum_{n=1}^{\alpha} \frac{d^n}{R^n} P_n \cos\theta, \text{ for } \theta \backsimeq 180°$$

becomes $$-\frac{d}{R} + \frac{d^2}{R^2} \ldots = -\frac{d}{R} \times \frac{1}{1+\frac{d}{R}} = -\frac{d}{R+d} = -\frac{d}{a}$$

$$\sum_{n=1}^{\alpha} \frac{1}{n} \frac{d^n}{R^n} P_n \cos\theta, \text{ for } \theta \backsimeq 0°$$

becomes $$\frac{d}{R} + \frac{d^2}{2R^2} + \frac{d^3}{3R^3} + \ldots = \log \frac{1}{1-\frac{d}{R}}$$

$$= \log \frac{R}{R-d} = \log \left(1+\frac{d}{a}\right)$$

$$\sum_{n=1}^{\alpha} \frac{1}{n} \frac{d^n}{R^n} P_n \cos\theta, \text{ for } \theta \backsimeq 180°$$

becomes $$-\frac{d}{R} + \frac{d^2}{2R^2} - \frac{d^3}{3R^3} \ldots = \log \frac{1}{1+\frac{d}{R}}$$

$$= \log \frac{R}{R+d} = \log \left(1-\frac{d}{a}\right)$$

The expression for the potential across the potential stakes $P_1$, $P_2$ becomes, approximately to within 10%:

$$V_{P_1P_2} = \frac{I}{4\pi R} \frac{1}{\sigma_2} + \frac{1}{4\pi R \sigma_2} \sum_{n=1}^{\alpha} \frac{d^n}{R^n}$$

$$\left[\frac{2}{\left(\frac{\sigma_1}{\sigma_2}+1\right)} + \frac{1}{n\left(\frac{\sigma_1}{\sigma_2}+1\right)}\right] P_n \cos\theta$$

$$= \frac{I}{4\pi} \frac{1}{a \pm d} \frac{1}{\sigma_2} \left[1 \pm \frac{2\sigma_2}{\sigma_1+\sigma_2} \frac{d}{a} + \frac{\sigma_2}{\sigma_1+\sigma_2} \log\left(1\pm\frac{d}{a}\right)\right]$$

$$= \frac{I}{4\pi} \frac{1}{a} \frac{1}{\sigma_2} \frac{1}{\left(1\pm\frac{d}{a}\right)}$$

$$\left[1 \pm \frac{2\sigma_2}{\sigma_1+\sigma_2} \frac{d}{a} + \frac{\sigma_2}{\sigma_1+\sigma_2} \log\left(1\pm\frac{d}{a}\right)\right]$$

In the above expression, the upper set of signs (+) refer to the case when $\theta=0°$, and the lower set (—) to the case when $\theta=180°$.

Thus, if $\sigma_1 = 10\sigma_2$, and $a=40$ feet, then the normal, or reference potential, (no ore present at $C_1$ or $P_1$) is:

$$V_{P_1P_2} = \frac{I}{4\pi} \frac{1}{40} \frac{1}{\sigma_2} = V_{P_1} = 1.66 \text{ if } \frac{1}{\sigma_2} = \rho_2 = 25,000$$

ohms per cm. cube.

This is Case No. 1, in the tabulation of Figure 2.

If a sphere of ore, not greater than 10 feet in radius is present at $C_1$, then the potential appearing across the potential stakes is:

$$V_{P_1P_2} = \frac{I}{4\pi} \frac{1}{40} \frac{1}{\sigma_2} \times 0.85$$

for $\theta=0$ degrees and $d=10$ feet; and $$V_{P_1P_2} = \frac{I}{4\pi} \frac{1}{40} \frac{1}{\sigma_2} \times 1.23$$

for $\theta=180$ degrees and $d=10$ feet.

In the case of $\theta=0$ degrees, the main portion of the local ore body at $C_1$ is on the side of $C_1$ remote from $P_1$ and the potential at $P_1$ is actually below the reference potential, (no ore present). This is similar to Case No. 2, in the tabulation of Figure 2 where, however, the radius of the ore sphere=2 feet and $$\frac{1}{\sigma_2} = \rho_2 = 2500 \text{ ohms per cm. cube}$$

and $$\frac{1}{\sigma_1} = \rho_1 = 1000$$

When, however, $\theta=180$ degrees, the main portion of the local ore body at $C_1$ is on the side of $C_1$ nearer to $P_1$, and the potential at $P_1$ is increased above the reference potential. It is known, however, that there is no ore present at $P_1$. This is similar to Case No. 3 in the tabulation.

If the current electrode $C_1$ is at the center of the local ore body at $C_1$ then $d=0$ and the potential at $P_1$ is the same as the reference potential when no ore is present. This is also Case No. 4 in the tabulation.

The action at $P_1$ (for the local ore at $C_1$, in the above) is equivalent to replacing $C_1$ by a decreased or increased current source respectively of values $0.85I$, $1.23I$, and $I$, with no ore present anywhere.

By the theorem of reciprocity involving $C_1$ and $P_1$, the above relations would hold for the case where there is ore at and around $P_1$ but not at $C_1$. Thus the result of having $B_1^1$, $B_2^1$, $B_3^1$, at $P_1$ is just the same as having $B_1$, $B_2$, $B_3$, at $C_1$.

Consider now the case where ore is locally present in a sphere like pod at both $C_1$ and $P_1$ but such pods are not interconnected.

The effect of the ore at $C_1$ on $P_1$ from the above is obtained by replacing the current $I$ by $$I \frac{1}{\left(1 \pm \frac{d}{a}\right)}\left[1 \pm \frac{2\sigma_2}{\sigma_1+\sigma_2}\frac{d}{a}+\frac{\sigma_2}{\sigma_1+\sigma_2}\log\left(1 \pm \frac{d}{a}\right)\right]$$

If ore is now placed at $P_1$ we need only take account of the effect of this current at $C_1$ on the case for ore at $P_1$ to have the resulting effect when ore is locally present at both $C_1$ and $P_1$.

Then $V_{P_1P_2}$ for this case is:

$$V_{P_1P_2} = \frac{I}{4\pi a} \frac{1}{\sigma_2} \left(\frac{1}{1 \pm \frac{d_1}{a}}\right)\left[1 \pm \frac{2\sigma_2}{\sigma_1+\sigma_2}\frac{d_1}{a}+\frac{\sigma_2}{\sigma_1+\sigma_2}\log\left(1 \pm \frac{d_1}{a}\right)\right] \times \left(\frac{1}{1 \pm \frac{d_2}{a}}\right)\left[1 \pm \frac{2\sigma_2}{\sigma_1+\sigma_2}\frac{d_2}{a}+\frac{\sigma_2}{\sigma_1+\sigma_2}\log\left(1 \pm \frac{d_2}{a}\right)\right]$$

where $d_1$=distance of $C_1$ to centre of sphere-like local ore body at $C_1$ and $d_2$=distance $P_1$ to centre of sphere-like local ore body at $P_1$.

If $d_1$ and $d_2$ are both zero, $C_1$ and $P_1$ are at the centre of their respective ore bodies and $$V_{P_1P_2} = \frac{I}{4\pi a}\frac{1}{\sigma_2} = V_{P_1} =$$

the normal potential. This is Case No. 7 as listed with Figure 2.

If $(+d_1)$ and $(+d_2)$ are involved, the value of $V_{P_1P_2}$ is actually reduced below the normal potential. See Case No. 5, Figure 2.

If $(+d_1)$ and $(-d_2)$ or $(-d_1)$ and $(+d_2)$ are involved and $d_1 \diamond d_2$ the value of $V_{P_1P_2}$ is approximately that of the normal potential, Case No. 6 of Figure 2.

If $(-d_1)$ and $(-d_2)$ are involved, Case No. 8, Figure 2, $V_{P_1P_2}$ is greater than the normal potential. Only for this last case, is $V_{P_1P_2}$ greater than the normal potential. It is, hence, the only case involving an increased potential such as would be expected for continuity of the ore between $C_1$ and $P_1$. This is also that case for which the local ore occurrences at $C_1$ and $P_1$ have their centres within the $C_1P_1$ interval i. e. extend into the $C_1P_1$ interval rather than away from it. (Case 8, bodies $B_2$ and $B_2{}^1$, Figure 2).

In other words, as was reasoned from the equipotential picture of Figure 1, whenever the potential $V_{P_1}$ is greater than the above defined potential normal $$\frac{\rho_2 I}{4\pi a}$$

the ore occurrences at $C_1$ and $P_1$ will be to a greater extent within the interval $C_1$ and $P_1$ than without it and ore continuity may exist between $C_1$ and $P_1$. If $V_{P_1}$ is equal to or less than $$\frac{\rho_2 I}{4\pi a}$$

continuity cannot exist.

Thus, it is only necessary to record $V_{P_1}$ and $C_1$ and $P_1$ are contacting the 2 ore exposures. Continuity can be present only if $V_{P_1P_2}$ is greater than $$\frac{\rho_2 I}{4\pi a}$$

the normal voltage drop, $P_1$ to infinity, or to $P_2$, to be expected in the surrounding country rock. Whether or not continuity actually exists depends on the magnitude of $V_{P_1}$ when $C_1$ and $P_1$ are both contacting ore, but whenever $V_{P_1}$ is greater than the normal voltage drop, continuity can exist and in any case the occurrences at $C_1$ and $P_1$ are tending toward continuity.

Wherever $V_{P_1}$ observed is greater than $$\frac{\rho_2 I}{4\pi a}$$

and ore is present at both $C_1$ and $P_1$, the likely form of the ore body between $C_1$ and $P_1$, which form is generally inferable from geology, permits the expected potential $V_{P_1}$ for the case of continuity to be calculated and compared with the observed potential.

Comparing the observed potential with the calculated potential for assumed continuity, and with the calculated potential for local bodies at $C_1$ and $P_1$ tending toward continuity (Case No. 8, Figure 2) permits the determination of whether or not actual continuity is present. If continuity is present the potential $P_1$ may exceed the reference potential by a readily measurable amount, as shown in Case No. 9, Figure 2.

Figure 3 shows the potential at $P_1$, for $P_1$ at the ends of various shaped ore bodies remote from $C_1$. In addition, the variation of potential along the axes of extension of the bodies is shown although not necessary to the discussion. It will be noted that the potential at $P_1$ (volts per ampere of current flowing through the current electrode $C_1$), located at the end of the various shaped continuous ore bodies, is significantly higher than the reference or normal potential obtained in country rock. In the event such ore bodies are not continuous, between the points of contact of the current and potential electrodes $C_1$ and $P_1$, respectively, the observed voltage would be less than that indicated by the specific curves.

Although the above discussion has been confined to the case where the ore bodies are finite and lens-shaped, similar to spheres, cylinders (prolate spheroids) or discs or pan cakes (oblate spheroids), it will be recognized that the method and procedure outlined loses nothing in generality when the ore bodies are sheet-like or planar in form. Again, the current electrode $C_1$ and the potential electrode $P_1$ are made to contact the ore and the observed potential is compared with the normal potential on one hand, and the calculated potential for the case of continuity on the other hand.

I claim:

1. The method of establishing whether or not ore continuity exists between two spaced zones of ore occurrence wherein such zones are separated by relatively barren ground, said method comprising impressing a current flow of known magnitude between a pair of current electrodes, one current electrode contacting one of the zones of ore occurrence and the other current electrode contacting the surrounding ground at a point relatively far removed from such zone of occurrence, and measuring the resulting potential appearing across a pair of pick-up electrodes one pick-up electrode contacting the other zone of ore occurrence and the other pick-up electrode contacting the surrounding ground at a point well removed from the said current electrodes.

2. The method of determining whether two, apparently-isolated, subterranean ore occurrences, intersected by two separated drill holes, are interconnected, said method comprising inserting a first current electrode into contact with the ore occurrence intersected by one such drill hole, inserting a second current electrode into the surrounding ground at a point well removed from the said first current electrode and other drill hole, inserting a first potential electrode into contact with the ore occurrence intersected by the second drill hole, inserting a second potential electrode into the surrounding ground at a point well removed from all of the other three electrodes, impressing a current of known magnitude between the two current electrodes and measuring the resultant potential difference between the two potential electrodes.

3. The method of determining the extent of an elongated, subterranean ore body having one exposed end, said method comprising inserting a first current electrode into such exposed end of the ore body, inserting a second current electrode into the surrounding ground at a point well removed from the first current electrode and in a direction away from the ore body, forming a spaced series of drill holes along the general extent of the ore body, selecting only those drill holes which intersect subterranean ore occurrences, inserting a first potential electrode into the ground at a point well removed from each of the current electrodes and each of the selected drill holes, inserting a second potential electrode into one of the selected drill holes and into contact with the intersected ore occurrence, impressing a current of known magnitude between the two current electrodes, measuring the resultant potential across the two potential electrodes, and sequentially moving the said second potential electrode into contact with the ore occurrences intersected by the other selected drill holes and repeating the potential measurement.

ARTHUR A. BRANT.

REFERENCES CITED

The following references are of record in the file of this patent:

UNITED STATES PATENTS

| Number | Name | Date |
| --- | --- | --- |
| 2,141,590 | Blondeau | Dec. 27, 1938 |
| 2,233,420 | Leonardon | Mar. 4, 1941 |
| 2,368,217 | Hayes | Jan. 30, 1945 |